United States Patent Office 3,440,070
Patented Apr. 22, 1969

3,440,070
VITRIFIED PRODUCTS
John L. Dewey, Pleasanton, Calif., assignor to The Dow Chemical Company, Midland, Mich., a corporation of Delaware
No Drawing. Filed May 5, 1966, Ser. No. 547,773
Int. Cl. C04b 33/12, 33/04
U.S. Cl. 106—67           9 Claims

ABSTRACT OF THE DISCLOSURE

A vitrified article of high strength, and novel method of making such article, which comprises admixing with a moldable green clay stock, per hundred parts by weight of kaolinate clay in said stock, between about 0.005 and (sometimes referred to as a chelant) between about 0.005 and about 0.2 part of a polyoxyalkylene glycol (sometimes called a polyglycol) and optionally an aqueous polystyrene latex in an amount sufficient to provide up to 0.2 part of polystyrene solids, and sufficient water to produce a moldable composition; molding the composition into a desired shape; and heating or firing the so molded article, as in a kiln or a hot air oven.

---

The invention is directed to articles made by shaping and molding a clay composition and heat treating the composition so made.

The art of making shaped articles from clay is traceable to earliest records of mankind. Broadly, the techniques employed in making clay articles and the articles themselves are often referred to as ceramic art or ceramics.

Heat treating, often called firing, is sometimes described as a vitrification phenomenon because the firing causes glassy bonds to form among the clay components.

The goal of ceramics may be described as that of obtaining (with a relatively high degree of assurance), a plastic clay mass which can be satisfactorily molded into desired shapes having sufficient green strength to retain such shapes during handling and which, upon subsequent heating and firing, produces an end product possessing adequate strength properties for a wide variety of uses. There have been improvements in the appearance and utilitarian aspects of clay articles over the years as a result of improved procedures and formulations. However, a need exists for a clay composition which provides more satisfactorily the various aspects of the goals of ceramic art. There is a particular need for a composition which possesses improved molding properties so that it may be readily molded into a desired shape and will retain this shape without damage prior to firing but which, after firing, shows no impairment of the strength properties normally associated with such clay articles because of the measures taken to improve the molding properties.

The uses of vitrified products are manifold, e.g., as sewer pipes, telephone conduits, brick, art objects, ornaments, bathroom fixtures, insulators, and divers classes of materials known as earthenware, which includes dinnerware, pottery, containers, and the like.

In general, clay products in the past have been largely made by grinding clay and plasticizing the ground clay with water which may be done simultaneously or the ground clay subsequently mulled with water in a muller; compacting the so ground and plasticized clay by the use of pressure thereby forming the articles into desired shapes; and heat treating or firing the so-shaped articles.

It is important that sufficient plasticization or moldability be provided to permit proper shaping of the deformable clay material. In conventional clay molding, between about 18 and 28 percent total moisture (including chemically bonded water present) is provided to impart necessary plasticity during the forming stage. Such relatively high amount of moisture usually must be reduced before firing the shaped object. This is accomplished by an intermediate drying step. The percent moisture is usually required to be reduced by the intermediate drying step to not greater than about 10 percent and preferably to not greater than about 8.0 percent or less. Tests have shown that when green clay articles having a moisture content, respectively, of 7.4 percent and 8.9 percent, based on the clay weight, but otherwise identical compositions are fired, the final product derived from the clay of higher water content exhibits a 25 percent greater absorption of water and 33 percent less resistance to permeation by air, as determined by standard tests. Low absorption and high resistance to permeation are desirable. A method of making ceramic products wherein the original water content is not undesirably high even though the intermediate drying step is eliminated is highly desirable.

When additional plasticization has been desired in the past, additional water has usually been added. Additional water further prolongs the intermediate drying step which increases the time expended and the cost of producing the ceramic articles.

Attempts to improve the moldability of clay compositions without increasing the moisture content have been made. Such attempts have included the incorporation of hydrolyzed starch and waxes. However, the presence of the starch or wax has introduced areas of weakness in the final product and has been responsible for increasing the amount of scrap resulting during the manufacturing process.

The invention provides a moldable composition which has improved molding properties, good green strength, and a sufficiently low water content as not to require a drying step prior to firing the molded article in the kiln and which provides heat treated products of superior properties.

Excellent source material on the art of making ceramic products may be found in Kirk-Othmer Encyclopedia of Chemical Technology, 2nd ed., vol. 5, pp. 541 to 486. Of special interest is the discussion concerning the nature of the behavior of water in admixture with clay and the criticality of the amount of water on strength properties, it being pointed out therein that strength increases with water up to a critical point whereupon additional water decreases the strength of the formed ceramic article.

The invention, accordingly, is an improved method of making improved vitrified ceramic products and the products so made. The invention comprises mixing, by weight, with 100 parts of a kaolinite clay, between about 0.005 and about 0.2 part of salt of an aminopolycarboxylic acid (hereinafter referred to as a chelant) between about 0.005 and 0.2 part of a polyoxyalkylene glycol (commonly called a polyglycol) and optionally an aqueous polystyrene latex (usually having 40 to 60 percent total solids) to provide up to about 0.2 part of polystyrene, and sufficient water to provide a moldable composition; molding the composition into a desired shape; and heating or firing the so molded article, as in a kiln or hot air oven.

The firing temperature employed in the practice of the invention is between 1000° C. and 2000° C.

It has been found convenient in the practice of the invention to prepare an aqueous composition containing all the water and necessary additives and admixing the resulting aqueous composition with the clay. Suggested ranges to use in the preparation of the aqueous composition for addition to the clay employed in percent by weight to make 100 percent by weight of the composition, are:

(a) Between about 20 and 30 percent by weight of a polyoxyalkylene glycol having a molecular weight of between 2,000 and 20,000;

(b) Between about 25 and 32 percent of water;

(c) Between about 30 and 40 percent of a 35 to 70 percent by weight aqueous dispersion of polystyrene;

(d) Between about 12 and 20 percent of a water-soluble salt of an aminopolycarboxylic acid in amounts of each (a), (b), (c), and (d); to make a total of 100 percent by weight of said aqueous additive composition.

More common ranges of ingredients to employ are:

|  | Percent |
|---|---|
| Water | 27.5–30 |
| Polyglycol | 22.5–27.5 |
| Polystyrene latex | 32.5–35 |
| Selected salt of an aminopolycarboxylic acid | 14–16 |

A selected weight of the above composition totaling 100 percent is added to 100 parts of clay by weight.

The selected weight of the above composition to admix with the clay is that which gives the desired amount of aminopolycarboxylic salt, e.g., between 0.005 and 0.02 percent based on the clay. This will also incorporate sufficient amounts of the polyglycol, polystyrene, and water desired. Variations are made in the proportions of the additive components as necessary, dependent upon specific needs as further set forth herein.

Illustrative of a preferred practice of the invention is to add about 2 pounds of a 50 percent solution of a 3,000 to 5,000 molecular weight polyoxyethylene glycol (polyglycol) premixed with between about 2 and 4 pounds of a selected salt of an aminopolycarboxylic acid as a 30 to 40 percent total solids aqueous solution, per ton of ceramic quality clay and sufficient water to result in between about 7 and about 7.8 percent total water content.

Such mixture results in a final fired product which may have a wall thickness as little as about one half that of the thickness of walls of ceramic products made according to conventional practice. Such thinner walled articles made according to the invention have strength values comparable to the much thicker walled articles made conventionally. It is obvious that such results afford substantial savings in material and handling. They also provide articles which are lighter in weight and therefore are useful under conditions wherein the thicker walls of greater weight might not be acceptable.

Optionally, a water-soluble surface-active agent (surfactant) may advantageously be incorporated into the moldable composition. The amount employed is not highly critical, up to about 0.1 part, per 100 parts of clay, being suggested. A particularly desirable surfactant to employ is the reaction product of ethylene oxide and an alkylphenol, and more especially the reaction product of 9 moles of ethylene oxide and one mole of nonylphenol.

The polyglycol is employed usually in an amount of between 0.02 and 0.10 and preferably between about 0.03 and 0.05 part per 100 parts by weight of clay employed. Illustrative of a polyglycol to employ in the practice of the invention is polyoxyethylene glycol having a molecular weight of between about 2,000 and 10,000, one having a molecular weight of between about 3,500 and 4,500, e.g., about 4,000 being particularly suitable.

Such additives as natural gums (e.g., guar, tragacanth, or karaya), alginate, carboxymethylcellulose, dextrine and/or starch may be present in the composition of the invention in small amounts. The particular kaolinite clay selected to be employed in the manufacture of vitrified ceramic products depends both upon the type and extent of natural clay which is conveniently available and which is economical and upon the intended use of the finished product.

In general, clay may be described as a finely particulated naturally occurring earthen material (usually colloidal in size) that becomes plastic when wet (thixotropic in the presence of sufficient water), substantially rigid but fragile when subsequently dried, and vitreous when fired at a sufficiently high temperature. Kaolinite clay is generally considered to consist predominantly of aluminum silicate hydrates containing various lesser proportions of hydrated silicates of other metals including those of iron, magnesium, calcium, potassium, sodium, and titanium. A suggested analysis of kaolinite of a particularly pure state is 39.5 percent $Al_2O_3$, 57.5 percent $SiO_2$ and 3.0 percent bound water. Other materials than the metal silicates in minor proportions are also present, some of which contribute to desirable unique properties of clays, e.g., fine particle sand, fossil fragments, carbonates, dolomites, sulfates, and sulfides. Lesser amounts of various classes of clays other than kaolinite may be present so long as kaolinite is predominant. Other of such clays which may be present in minor amounts include montmorillonite, illite, muscovite, chlorite, vermiculite, sepiolite, and palygorskite.

The aminopolycarboxylic salt or chelant required to be employed in the practice of the invention is readily available on the market, e.g., under the trademark Versenate, Versenol, Versene, and Versenex. Illustrative of chelants useful in the practice of the invention are sodium, potassium, lithium, and calcium salts of Ethylenediaminetetraacetic acid,
Diethylenetriaminopentaacetic acid, and
N(2-hydroxyethyl)ethylenediaminetriacetic acid.

Mixtures of such salts may also be used.

Specific examples of suitable chelants are the disodium, trisodium, tetrasodium, and pentasodium salts of di-, tri-, tetra-, and pentaacetic acid; the calcium disodium salt of ethylenediaminetetraacetic acid; the trisodium salt of N-(2-hydroxyethyl)ethylenediamine triacetic acid. The following are illustrative of suitable salts set forth immediately above and available commercially under the following names: solid Versene and aqueous solutions thereof, e.g., Versene 9 and Versene 100; Versene NA which is usually a dihydrate of Versene; solid Versenex and aqueous solutions thereof e.g., Versenex 80; solid Versenol and aqueous solutions thereof. Versene, Versenex, or Versenol are available in varying suffix number designations, as indicated above, which correspond to the number of milligrams of $CaCO_3$ which are equivalent to 1 gram of the Versenate, as measured by oxalate titration. Recommended amounts of the Versenate to employ correspond to the number of milligrams equivalent to 1 gram of $CaCO_3$, i.e., the higher the suffix number, the less the amount of the Versenate is required. The following Versenates and recommended amounts to employ in the invention are illustrative.

| Versenate: | Range employed in parts by weight per 100 parts of clay |
|---|---|
| Versene solid | 0.005–0.05 |
| Versene 100 | 0.010–0.11 |
| Versenex solid | 0.005–0.05 |
| Versenex 80 | 0.012–0.14 |
| Versenol solid | 0.005–0.05 |
| Versenol 120 | 0.018–0.20 |

In practice, the upper limit of the chelant to employ is largely a matter of economics since amounts greater than those suggested appear to have no detrimental effect even when employed as high as about one part or more per hundred parts of clay.

In practicing the invention, known plasticizers, binders, lubricants, deflocculants, and dispersants, known to be useful in clay compositions for molding ceramic products, may be employed. Such materials include flour, starch, natural gums, cellulose acetate, polyvinyl alcohol, stearates, paraffin, carboxymethylcellulose, and sodium salts thereof; polyacrylamide and polyvinylpyrrolidone. Since such additives are not required by the invention it is recommended that such additives be employed sparingly if at all. The dispersant, when employed, may be any common detergent. A reaction product of ethylene oxide and nonylphenol, one of which is available on the market under the trademark Dowfax 9N9, is particularly satisfactory, although a dispersant is not essential to the practice of the invention.

The following comparative tests and examples of the invention will serve to demonstrate the manner by which the invention is carried out and the advantages of the practice of the invention over conventional procedures in the production of ceramic goods.

In general, both the comparative tests and the examples of the invention were conducted as follows:

(1) A crude kaolinite clay was ground to a size such that it substantially all passed through a 65 mesh screen (U.S. Bureau of Standards sieve series). The dry material employed, which included an aminopolycarboxylic salt and the polyoxyalkyleneglycol additives, were added during the grinding step.

(2) The ground clay containing the dry additives was mixed in a muller with enough water to provide the desired moisture content.

(3) The product of the mulling step was then compacted by passing a desired amount thereof between spring loaded rollers maintaining a bit of about ¼ inch.

(4) The so compacted product was then granulated by passage through a set of spike-toothed rollers and thereafter screened employing a 35 mesh screen. That material which passed through the screen was recirculated to the compacter feed; that which was too large to pass through the 35 mesh screen was passed through an 8 mesh screen; that which was too large to pass through the 8 mesh screen was returned to the grinder.

(5) Material which passed through the 8 mesh screen (in other words that having a mesh between 35 and 8) was compressed and formed into the shape of the desired product employing a compacting pressure of about 8,000 p.s.i.g. in a punch and die assembly to form unfired or green shapes which (after certain tests were performed thereon, as hereinafter described) were then conveyed to the kiln and fired. No intermediate drying step was employed.

The properties of both the green and the fired products were ascertained by a number of standard tests used in the vitrified clay products industry. Such tests were employed both for comparative purposes and for evaluation of the invention; they include the following:

(1) Green strength: this is a measure of the resistance to fracturing of unfired shapes. It is determined by the force, measured in pounds of load and applied at the middle of a specimen of the unfired compacted clay material supported at each end, which is necessary to break the specimen.

(2) Pressed bulk density (PBD): this is determined as follows: enough clay is taken to result in a compact having a weight of about 100 grams. The clay is pressed at a force of 32,000 pounds as measured over the area of an applied platen by means of a 4-inch ram which calculates to be a pressure of 8,000 p.s.i.g. The thickness of the compact, as measured by a micrometer, is not greater than 0.7 inch which indicates good bulk density material for ceramic use. The net dry weight of the compact in grams divided by the volume in milliliters gives the pressed bulk density thereof.

(3) Fired bulk density (FBD): this is the weight in grams to volume in milliliters ratio for the compact after it has been fired. It is desired that this value be relatively high.

(4) Resiliency: this is the capacity of an unfired shape to return to its original form after deformation. The test is conducted by hand and subjectively judged. A high degree of resiliency is desirable.

(5) Permeability (hereinafter termed permeation time): this is the time in seconds required for a standard volume of air to pass through a fired compact disc of standard dimensions under a pressure drop of 15 p.s.i.g. The lower the actual permeability, the greater the permeation time i.e., the larger the number of seconds required. Accordingly, high permeation time values measured in seconds are desired.

(6) Absorption: this is a measurement of weight gain of a standard compact disc after immersion in boiling water for eight hours, removal therefrom, and rapid drying. It is expressed as the percentage increase of the weight after immersion of the original dry weight of the disc. It is desirable that the value be relatively low.

(7) Percent moisture: this is a measure of the total water content of an unfired specimen. It is determined by calculating the percentage weight loss on firing a green sample. This percent moisture includes both the bound water and the free water added during processing. It is desired that the value be as low as possible without impairing molding characteristics.

The value obtained for the pressed bulk density (PBD) of a compact is a particularly significant single test. A pressed bulk density value of 2.2 or greater correlates with a high permeation time value as measured in seconds (actually low water permeability) and a low absorption value after firing.

Comparative test A

A moldable clay composition was prepared by admixing 2,000 pounds kaolinite clay, 6 pounds hydrolyzed starch, and 145 pounds of water, wax emulsion, an admixture of water and paraffine wax, and additional water to provide a total water content of about 9.5 percent by weight of the clay. Ten compacts were made from this composition. The composition was not as easily molded into shapes as was desirable. The pressed bulk density of the green specimens was obtained. The compacts so made were fired and tested for permeation time and absorption and fired bulk density. The results of the tests are shown in Table I.

Example 1

The composition herein used employed the same amount and type of kaolinite clay as in Comparative Test A but the starch and the paraffin emulsion were not employed. There were, however, admixed with the clay 1.5 pounds of solid polyoxyethylene glycol having an average molecular weight of about 4,000 and 0.475 pound of ethylenediaminetetraacetic acid tetrasodium salt (added as a 38 percent by weight aqueous solution), to provide the chelant according to the invention, and sufficient water to provide a total moisture content of only 8 percent. This provided a percentage content of the polyglycol of 0.075 and the chelant of 0.015 percent. The mixture was ground and subsequently compacted without the difficulty incurred in the comparative test although the water content of this example was less than the 9.3 percent employed in comparative Test A. The compacts so made were fired and tested for permeation time and absorption as in comparative Test A. The results are shown in Table I, infra.

Example 2

This example of the invention was the same as that of Example 1 except that 0.1 percent of a 42.2 percent total solid polystyrene latex was admixed with the ingredients of Example 1. The pressed bulk density (PBD) and fired bulk density (FBD) were determined. The PBD was found to be 2.15 rather than 2.05 as in comparative Test A above and the FBD was found to be 2.30 rather than 2.175 as in comparative Test A above. The higher values obtained were made possible by the presence of the polystyrene latex and indicate the advisability of its use in the practice of the invention. In both Examples 1 and 2 the chelant employed was the tetrasodium salt of ethylenediaminetetraacetic acid. The results are also shown in Table I below:

It will be seen from Table II that the percent absorption was low and that the permeability time as measured in seconds necessary for air to permeate the sample was desirably high even though the moisture content was higher than the preferred amount.

Camparative test B

A kaolinic clay-water mixture was prepared and divided

TABLE I

| Identity of Test | PBD [1] | Percent Absorption | Moldability | Permeation time in seconds | FBD [2] |
|---|---|---|---|---|---|
| Comparative Test A | 2.05 | 12 | Poor | 60 | 2.175 |
| Example 1 | | 6 | Excellent | 168 | |
| Example 2 | 2.15 | | do | | 2.30 |

[1] PBD is pressed bulk density.
[2] FBD is fired bulk density in grams per milliliter.

Reference to Table I shows that the invention is characterized by: a lower permeability (as evidenced by the longer permeation time required for the standard volume of air to pass therethrough); lower absorption; and higher bulk densities of both the green and fired product.

Example 3

This example of the invention was conducted to show the effect of greater amounts of a chelant employed even though the water content is 8.5 percent rather than the preferred amount of about 8.0 percent. The chelant employed was the same compound as that employed in the examples above but was employed in an amount of 0.025 percent by weight of clay rather than 0.015 percent, as in the preceding examples. The polyoxyalkylene glycol present was the same as that in Example 1. The results of this example are shown in Table II.

into three portions. Each contained 8.5 percent total moisture. Into each of two portions thereof was admixed the chelant employed above (viz. the tetrasodium salt of ethylenediaminetetraacetic acid) in differing amounts as stated in Table III below, but no other additive. In the remaining portion there was admixed polyoxyethylene glycol having a molecular weight of about 4,000 but no other additive. The chelant and the polyglycol were added as aqueous solutions. The amounts of each employed and the results of the tests run on the green and fired ceramic products are also shown in Table III below:

TABLE III

| Formulation | Green Strength | Resiliency | Moldability | PBD [1] | FBD [2] | Percent Absorption | Permeation Time In Seconds |
|---|---|---|---|---|---|---|---|
| 0.143 percent chelant as 38 percent solution in water (no polyglycol). | Low | Brittle | Poor | 2.10 | 2.15 | 7.8 | 205 |
| 0.125 percent chelant as 50 percent solution in water (no polyglycol). | Low | do | do | 2.10 | 2.15 | 7.4 | 220 |
| 0.125 percent Polyglycol E-4000 as 50 percent solution in water (no chelant). | Fair | Fair | do | 2.10 | 2.20 | 7.5 | 165 |

[1] and [2] have the same significance as in Tables I and II.

TABLE II 100 parts by weight of the ceramic clay present in the

| | |
|---|---|
| Green strength | Good |
| Moldability | Very good |
| Resiliency | Fair |
| PBD [1] | 2.12 |
| FBD [2] | 2.23 |
| Percent absorption | 6.0 |
| Permeation time in seconds | 205 |

[1] and [2] have same significance as in Table I.

Reference to Table II shows that when only one of either the polyglycol or the chelant is present (although some improvement is indicated) the results are not fully satisfactory. It appears clear that the presence of the chelant and the polyglycol produce a synergistic effect.

Example 4

This example was conducted to show the effect on properties of the green and fired ceramic products made according to the invention when the chelant, polyglycol, polystyrene latex, and water are varied. The chelant and the polyglycol were those employed in the preceding examples. The percentage of each employed, based upon 100 parts by weight of the ceramic clay present in the mixture, together with the results of the tests performed, are shown in Table IV.

TABLE IV

| Polyglycol | Percent Chelant as a 50% aqueous sol'n. | 42% solids Polystyrene Latex [3] | Percent H₂O | Green Strength | Resiliency | Moldability | PBD [1] | FBD [2] | Percent Absorption | Permeation Time In Seconds |
|---|---|---|---|---|---|---|---|---|---|---|
| 0.050 | 0.025 | 0.100 | 8.9 | Good | Good | Excellent | 2.175 | 2.25 | 4.2 | 340 |
| 0.054 | 0.027 | 0.108 | 8.2 | do | High | do | 2.15 | 2.25 | 3.1 | 640 |
| 0.054 | 0.027 | 0.108 | 7.9 | Excellent | Excellent | do | 2.15 | 2.30 | 3.4 | 630 |
| 0.060 | 0.027 | 0.166 | 7.9 | do | do | do | 2.15 | 2.30 | 3.1 | 785 |
| 0.030 | 0.014 | 0.083 | 7.9 | do | do | do | 2.15 | 2.30 | 3.8 | 595 |
| 0.050 | 0.025 | 0.100 | 6.3 | Good | Good | do | 2.175 | 2.25 | 4.5 | 270 |
| 0.087 | 0.050 | 0.087 | 8.3 | Excellent | High | do | 2.15 | 2.30 | 2.9 | 765 |

[1] and [2] have the same significance as in the preceding tables. [3] 42% polystyrene latex.

Example 5

This example was carried out similarly to that of Example 4 of the invention except that the chelant employed was the pentasodium salt of diethylenetriaminepentaacetic acid instead of the tetrasodium salt of diethylenediaminetetraacetic acid. The amount of the chelant, the polyoxyethylene glycol, and the polystyrene latex employed, together with the test results of the green and of the fired ceramic products made, are shown in Table V.

TABLE V

| | |
|---|---|
| Polyglycol in 50% aqueous solution, percent | 0.05 |
| Chelant in 40% aqueous solution, percent | 0.024 |
| 42% solids polystyrene latex, percent | 0.021 |
| $H_2O$, percent | 8.6 |
| Green strength | Very good |
| Resiliency | High |
| Moldability | Excellent |
| PBD [1] | 2.13 |
| FBD [2] | 2.28 |
| Absorption, percent | 3.1 |
| Permeability time in seconds | 450 |

[1] and [2] have the same significance as in the tables above.

Reference to Table V shows that the aminopolycarboxylic acid salt employed may be any one of those falling under the generic definition of a water-soluble salt of an aminopolycarboxylic acid (of which the Versenates are illustrative) in the presence of the polyoxyalkyleneglycol, preferably with polystyrene latex, and that such composition produces very excellent clay molding stock in accordance with the practice of the invention.

Example 6

This example illustrates the fact that a ceramic article prepared according to the invention and having a reduced moisture content is superior to a ceramic article prepared according to conventional practice employing as low a moisture content as was possible without seriously impairing molding properties.

A composition consisting of 2,000 parts of ceramic clay and 200 parts of water was prepared according to conventional practice. It is designated comparative Test C.

The following composition was prepared according to the invention and is designated Example 6:

| | Parts by weight |
|---|---|
| Ceramic clay (1 ton) | 2,000 |
| Polyglycol having a molecular weight of between 2,000 and 20,000 as a 50 percent solution thereof in water | 300 |
| Chelant as a 32 to 50 parts by weight solution thereof in water | 95 |
| Polystyrene latex (40 to 70%) | 600 |
| Surfactant, e.g., sodium salt of dodecylbenzene sulfonate | 5 |
| Water | 200 |

Sample articles were made employing kaolinite clay and water compositions employing the composition of Comparative Test C according to conventional practice for comparison and sample articles employing the above composition according to the invention. The samples, using the comparative composition, were formed with considerable difficulty in contrast to the samples formed according to Example 6 of the invention. After testing the samples for green strength and pressed bulk density, the samples were fired and the articles so made tested. The results are set out in Table VI.

Reference to Table VI shows that the green strength, bulk densities of both the green and fired articles, and percent absorption and permeability time in seconds of the fired ceramic articles were all much better according to the invention than in the comparative test which did not contain the additives required by the invention.

The above examples are illustrative only and variations can be made within the spirit of the invention to meet specific situations. For example, when greater lubricity is desired, the amount of polyglycol employed may be increased; when a higher green resilience is desired, the polystyrene may be increased, the amount of water decreased, and/or the amount of Versenate decreased slightly; when a higher degree of dispersion is desired, the chelant may be increased. It has been found advisable in some instances to add a small amount of a phosphate, e.g., $Na_4P_2O_7$, as an aid to dispersion in the presence of the chelant. In all embodiments of the invention the proportion of water in the initial composition is kept low, thereby to eliminate or lessen the time needed for a drying step prior to heat hardening the article.

Having described the invention, what I claim and desire to protect by Letters Patent is:

1. A clay composition adapted to vitrification by heat treatment consisting essentially by weight of:
   (a) 100 parts of a kaolinite clay;
   (b) between about 0.005 part and about 0.2 part of a water-soluble salt of an aminopolycarboxylic acid;
   (c) between about 0.005 part and about 0.2 part of a polyoxyalkylene glycol;
   (d) up to about 0.2 part of polystyrene dispersed in an aqueous dispersion thereof;
   (e) up to about 0.1 part of a water-soluble surfactant;
   (f) sufficient water to make a moldable mass suitable for forming shaped articles.

2. The composition of claim 1 wherein said salt of an aminopolycarboxylic acid is selected from the class consisting of sodium, potassium, lithium, and calcium salts of ethylenediaminetetraacetic acid, diethylenetriaminepentaacetic acid, N-(2-hydroxyethyl)ethylenediaminetriacetic acid.

3. The composition of claim 2 wherein the salt of the aminopolycarboxylic acid is the tetrasodium salt of ethylenediamine tetraacetic acid.

4. The composition of claim 2 wherein the salt of the aminopolycarboxylic acid is the penta-sodium salt of diethylenetriaminepentaacetic acid.

5. The composition of claim 1 wherein the polyoxyalkylene glycol is selected from the class consisting of polyoxyethylene glycol, polyoxypropylene glycol and polyoxybutylene glycol having an average molecular weight of between about 2,000 and 20,000.

6. The composition of claim 5 wherein said polyoxyalkylene has a molecular weight of between about 3,000 and 5,000.

7. An additive composition for admixture with a kaolinite clay to enhance the molding characteristics of said clay without detriment to the other desired properties thereof when molded in the green state or when subsequently heat treated to a hard, vitreous product, consisting by weight of:
   (a) between about 20 and 30 percent by weight of a polyoxyalkylene glycol having a molecular weight of between 2,000 and 20,000;
   (b) between about 25 and 32 percent of water;

TABLE VI

| | Percent Moisture | Green Strength in Pounds | PBD [1] | FBD [2] | Percent Absorption | Permeation Time in Seconds |
|---|---|---|---|---|---|---|
| Comparative Test C (no additives) | 7.4 | <25 | 2.05 | 2.15 | 30.0 | 40 |
| Example 6 | 7.0 | 57 | 2.20 | 2.40 | 2.8 | 475 |

[1] and [2] have the same significance as in the preceding tables.

(c) between about 30 and 40 percent of a 35 to 70 percent by weight aqueous dispersion of polystyrene;
(d) between about 12 and 20 percent of a water-soluble salt of an aminopolycarboxylic acid in amounts of each of (a), (b), (c), and (d);
to make a total of 100 percent by weight of said additive composition.

8. The composition of claim 7 wherein the water-soluble salt of an aminopolycarboxylic acid is selected from the class consisting of the sodium, potassium, lithium, and calcium salts of ethylenediaminetetraacetic acid, ethylenetriaminepentaacetic acid, and N-(2-hydroxyethyl)ethylenediaminetriacetic acid.

9. The composition of claim 7 wherein the polyoxyalkylene glycol is selected from the class consisting of:
polyoxyethylene glycol;
polyoxypropylene glycol; and
polyoxybutylene glycol, the selected glycol having an average molecular weight of between about 2,000 and 20,000.

References Cited
UNITED STATES PATENTS 2,019,619  11/1935  Carter et al. _____ 106—73

JAMES E. POER, *Primary Examiner.*

U.S. Cl. X.R.
106—71; 260—41

PO-1050
(5/69)

UNITED STATES PATENT OFFICE
CERTIFICATE OF CORRECTION

Patent No. 3,440,070        Dated April 22, 1969

Inventor(s) John L. Dewey

It is certified that error appears in the above-identified patent and that said Letters Patent are hereby corrected as shown below:

In Column 1, after line 16, insert --about 0.2 part of a salt of an aminopolycarboxylic acid--

SIGNED AND
SEALED
MAY 26 1970

(SEAL)
Attest:

Edward M. Fletcher, Jr.
Attesting Officer

WILLIAM E. SCHUYLER, JR.
Commissioner of Patents